US011962091B2

(12) United States Patent
Buadana et al.

(10) Patent No.: US 11,962,091 B2
(45) Date of Patent: Apr. 16, 2024

(54) INTEGRATED ARRAY ANTENNA

(71) Applicant: Ramot at Tel-Aviv University Ltd., Tel Aviv (IL)

(72) Inventors: Nadav Buadana, Tel Aviv (IL); Eran Socher, Tel Aviv (IL); Samuel Jameson, Tel Aviv (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 0 days.

(21) Appl. No.: 15/734,777

(22) PCT Filed: Jun. 5, 2019

(86) PCT No.: PCT/IL2019/050641
§ 371 (c)(1),
(2) Date: Dec. 3, 2020

(87) PCT Pub. No.: WO2019/234742
PCT Pub. Date: Dec. 12, 2019

(65) Prior Publication Data

US 2021/0234282 A1 Jul. 29, 2021

Related U.S. Application Data

(60) Provisional application No. 62/681,203, filed on Jun. 6, 2018.

(51) Int. Cl.
*H01Q 21/06* (2006.01)
*H01Q 3/30* (2006.01)
*H01Q 21/00* (2006.01)

(52) U.S. Cl.
CPC ............ *H01Q 21/061* (2013.01); *H01Q 3/30* (2013.01); *H01Q 21/0087* (2013.01)

(58) Field of Classification Search
CPC .... H01Q 21/061; H01Q 3/30; H01Q 21/0087; H01Q 23/00
See application file for complete search history.

(56) References Cited

U.S. PATENT DOCUMENTS 6,002,375 A * 12/1999 Corman .................. H01Q 1/38 257/728
6,768,454 B2 * 7/2004 Kingsley .................. H01Q 3/24 342/368

(Continued)

FOREIGN PATENT DOCUMENTS

CN 201946758 U 8/2011
KR 20110053222 A * 5/2011 ............ H01Q 3/267

(Continued)

OTHER PUBLICATIONS

International Search Report prepared by the Israeli Patent Office for PCT/IL2019/050641, dated Oct. 3, 2019, 3 pages.

(Continued)

*Primary Examiner* — Seokjin Kim
(74) *Attorney, Agent, or Firm* — Chernoff, Vilhauer, McClung & Stenzel, LLP

(57) ABSTRACT

There is described an integrated antenna for radiating an electromagnetic beam at a wavelength λ, for example, in a range of millimeter and submillimeter waves. The antenna is integrated in a dielectric die having specific dimensions, and is configured as a dense array comprising two or more radiating elements (transmitters). The proposed array is denser than a conventional 1D or 2D array, would such a conventional array be arranged on the same dielectric die with a spacing λ/2 between its neighbouring radiating elements.

16 Claims, 8 Drawing Sheets

(56) References Cited

U.S. PATENT DOCUMENTS

| | | | | |
|---|---|---|---|---|
| 7,884,768 | B2 * | 2/2011 | Navarro | H01Q 3/26 343/702 |
| 9,985,354 | B2 * | 5/2018 | Pance | H01Q 9/0485 |
| 11,101,572 | B2 * | 8/2021 | Bily | H04W 16/28 |
| 2015/0120189 | A1 * | 4/2015 | Giometti | H01Q 9/40 342/450 |
| 2015/0255861 | A1 * | 9/2015 | Cohen | H01Q 1/288 343/899 |
| 2015/0340765 | A1 * | 11/2015 | Dang | H01Q 21/0075 343/893 |
| 2017/0358866 | A1 * | 12/2017 | Xian | H01Q 21/22 |
| 2018/0006376 | A1 * | 1/2018 | Black | H04B 7/0452 |
| 2018/0048048 | A1 * | 2/2018 | Socher | H01Q 11/12 |
| 2018/0248592 | A1 * | 8/2018 | Ashrafi | H04L 5/0048 |
| 2018/0301814 | A1 * | 10/2018 | Zhang | H01Q 15/14 |
| 2018/0375182 | A1 * | 12/2018 | Kirino | H01Q 13/22 |
| 2019/0058260 | A1 * | 2/2019 | Kirino | H01Q 21/064 |
| 2019/0074569 | A1 * | 3/2019 | Kamo | G01S 13/345 |
| 2019/0103911 | A1 * | 4/2019 | Gharavi | H04B 7/15507 |
| 2020/0067559 | A1 * | 2/2020 | Wich | H04B 1/44 |

FOREIGN PATENT DOCUMENTS

| | | | | |
|---|---|---|---|---|
| WO | 2016135730 | A1 | 9/2016 | |
| WO | WO-2016135730 | A1 * | 9/2016 | H01Q 1/2283 |
| WO | WO-2018076072 | A1 * | 5/2018 | G01S 3/72 |

OTHER PUBLICATIONS

Written Opinion prepared by the Israeli Patent Office for PCT/IL2019/050641, dated Oct. 3, 2019, 6 pages.

Jameson, S. et al., "A 300GHz wirelessly locked 2×3 array radiating 5.4dBm with 5.1% DC-to-RF efficiency in 65nm CMOS," 2016 IEEE International Solid-State Circuits Conference (ISSCC), San Francisco, CA, 2016, pp. 348-349.

Sengupta, K. et al., "A 0.28THz Power Generation and Beam-Steering Array in CMOS Based on Distributed Active Radiators", IEEE J. Solid-State Circuits, vol. 47, No. 12, Dec. 2012, pp. 3013-3031.

Jameson, S. et al., "Sub-harmonic wireless injection locking of a THz CMOS chip array", IEEE Radio Frequency Integrated Circuits Symp., May 2015, pp. 115-118.

Tousi, Y. et al. "Scalable THz 2D Phased Array with +17dBm of EIRP at 338GHz in 65nm bulk CMOS," ISSCC Dig. Tech. Papers, Feb. 2014, pp. 258-259.

Han, R. et al., "A 320GHz Phase-Locked Transmitter with 3.3mW Radiated Power and 22.5dBm EIRP for Heterodyne THz Imaging Systems", ISSCC Dig. Tech. Papers, Feb. 2015, pp. 1-3.

Han R. et al., "A 260GHz Broadband Source with 1.1mW Continuous Wave Radiated Power and EIRP of 15.7dBm in 65nm CMOS", ISSCC Dig. Tech. Papers, Feb. 2013, pp. 138-139.

Marcatili, E, A. J., "Dielectric rectangular waveguide and directional coupler for integrated optics," in The Bell System Technical Journal, vol. 48, No. 7, , Sep. 1969, pp. 2071-2102.

* cited by examiner

INTEGRATED ARRAY ANTENNA

CROSS-REFERENCE TO RELATED APPLICATIONS

This is a national stage application filed under 35 USC 371 based on International Application No. PCT/IL2019/050641 filed Jun. 5, 2019, which claims priority under 35 USC 119 of U.S. Provisional Application No. 62/681,203 filed Jun. 6, 2018.

FIELD OF THE INVENTION

The present invention belongs to the field of integrated chip antennas, more specifically to modern applications thereof, which have large arrays of radiating array elements.

BACKGROUND OF THE INVENTION

Microminiaturization of modern chips with transmitters and receivers is an actual topic today. The growing interest in THz, millimeter- and submillimeter-Wave applications for consumer products over the past several years, drives researchers to look for compact and low-cost solutions for transmitters and receivers at the THz and mm-Wave frequency bands.

THz transmitters are usually based on Harmonic VCOs or frequency multipliers driving an on- or off-chip antenna. The short wavelength makes it possible for the antennas to be fully integrated on a chip and to form even quite large antenna arrays in a single die. Due to the limited voltage supply in scaled CMOS and the lower amplitude of harmonic generation at frequencies above transistor fmax, the radiated power out of a single element working around 300 GHz barely exceeds 0.5 mW at maximum [1]. Generating more power by combining signals from several locked sources on chip to the same on-chip antenna is not efficient due to the high loss of interconnects at these frequencies. Using conventional phased-array transmitter architectures, by spacing a 2D array of radiators with a minimum pitch of λ/2 (0.5 mm at 300 GHz) for spatial combining, limits the radiated power density in the chip to 2 $mW/mm^2$ and thus requires very large chips in order to generate more THz power.

As discussed, the conventional approach to implement a 2D source antenna array is to space the antenna sources by λ/2 from each other, to optimize spatial power combining.

FIG. 1*a* (prior art) schematically illustrates a substrate where the antenna sources on a chip are spaced by λ/2 from one another.

This conventional approach presents a problem when trying to realize large arrays on a bulk CMOS substrate. As the area increases, surface waves in the lossy substrate degrade the overall array gain. This may partially be alleviated by using post process techniques [3] or external elements such as superstrate Quartz and focusing Silicon lens [3,4].

OBJECT AND SUMMARY OF THE INVENTION

The main purpose of the invention is to propose a solution which overcomes the disadvantages of the above-mentioned prior art technique.

It was presented in [1] that a loop antenna can develop high gain over an optimal silicon die area.

Upon further analysis of, and experiments with the structure described in the Background above as [1], the Inventors have arrived to a conclusion that the directivity and the radiation efficiency, which together define the antenna gain, are pre-determined by the substrate dimensions rather than by the loop antenna dimensions. Results of the Inventors' research imply that the radiation mechanism is related to the dielectric resonance nature of the Silicon die itself rather than the magnetic dipole created by the loop antenna. The Inventors have come to a conclusion that the magnetic dipole excites the radiating mode inside the die when the die has such dimensions as to start behaving as a silicon Dielectric Radiation Antenna (DRA). In other words, the effect has been noted whenever the silicon die started demonstrating a notable dielectric resonance in a specific direction.

The Inventors have proposed their model of DRA. According to the Inventors' model, which treats the silicon die as a DRA, each radiating source is now considered as a feed for the DRA.

Based on that, the Inventors have developed a novel technical concept of an integrated antenna.

The main feature of the active DRA is that two or more radiating sources are integrated in a specific dielectric (for example, silicon) die in an improved array, which is denser and/or greater by number of radiating sources than a conventional array occupying the same area.

Any dielectric die exhibits some specific dielectric resonance.

However, one preferable feature of the proposed integrated antenna is that the die's dimensions are such that the die exhibits a dielectric resonance in a specific direction, so as to allow the die to behave as DRA when said radiating sources are activated. Such an integrated antenna may be called an active DRA.

Parameters of the die for such an active DRA, configuration and parameters of other elements of the active DRA may be determined based on the Inventors' model. More details will be provided below and in the Detailed description.

The new approach and the new technical solution proposed in the present patent application allow generating more radiated THz power out of a chip with a fixed area. In one example, the Inventors propose a new structure of the array of the radiating elements, which will be denser (for example, will comprise more antenna elements) than a conventional array for a given die: namely, a three dimensional array.

In another example, the Inventors have found that the radiating array elements may be placed on a dielectric chip in a more dense array than it was known before (namely, may be located at a spacing less than λ/2 from one another), and that higher values of TRP (Total Radiated Power) and EIRP (Effective Isotopic Radiating Power) may be obtained from such an array.

The disadvantages of the previously known technique just do not appear or become negligible in the arrangement proposed by the Inventors.

According to a first aspect of the invention, there is proposed an integrated antenna for radiating an electromagnetic beam at a wavelength λ (for example, belonging to a range of millimeter and submillimeter waves), wherein:

the antenna is integrated in a dielectric die having specific dimensions, and is configured as an array of two or more radiating elements (transmitters), and wherein said array is denser than a conventional, 1D or 2D array, would said conventional array be arranged on said dielectric die with a spacing λ/2 between the neighbouring radiating elements.

Density of an antenna array should be understood as a ratio between a number of radiating elements of the whole array and the area captured by that antenna array on the working (radiating) surface of the die. The working surface may be understood as a broader surface of the die carrying at least part of the radiating array.

In one embodiment of the integrated antenna, said array may be a 3D array occupying at least two layers in the dielectric die. One of such layers may constitute the working (radiating) surface of the die.

Such an embodiment may be separately defined as an antenna integrated in a dielectric die and configured as a 3D array comprising three or more radiating elements (transmitters).

In another embodiment of the integrated antenna, the radiating elements neighbouring in the array (1D, 2D or 3D array) may be placed at a spacing less than λ/2 from one another.

A more specific embodiment may be defined as an integrated antenna for radiating an electromagnetic beam at a wavelength λ (for example, belonging to a range of millimeter and submillimeter waves), wherein:

- the antenna is formed on a dielectric die and configured as an array of two or more radiating elements, wherein the radiating elements neighbouring in the array are placed at a spacing less than λ/2 from one another.

The proposed integrated antenna may be adapted for radiating an electromagnetic beam at the wavelength λ belonging to a range of millimeter and submillimeter waves.

In one preferred embodiment of the invention, the die exhibits dielectric resonance and thus forms a Dielectric Resonance Antenna (DRA).

More specifically, the dimensions of said dielectric die may be such that the die is capable of exhibiting dielectric resonance at said wavelength λ in a direction of the electromagnetic beam emitted from the die perpendicularly to its working (radiating) surface.

The Inventors have shown that in each of the integrated antennas defined above, the die may form a DRA (may exhibit a suitable dielectric resonance) if it has suitable dimensions.

Further, each of the integrated antennas defined above may in operation behave as a so-called Active DRA, wherein said radiation elements serve as radiation sources (feeds) of the DRA.

For any specific array of radiating elements, the dielectric resonance may exist simultaneously with mutual electric resonance of the radiating elements in the array. The electric resonance can be reached by selecting/computing a proper combination between inductance and capacitance of the radiating elements.

The Inventors have found that for any proposed integrated antenna to serve as an active DRA more effectively, the dielectric resonance of the die and the electric resonance of a radiating element should correspond to one another.

More specifically, the following criterion is recommended:

- dimensions of the die and parameters of said two or more radiating elements may be selected so that frequency of dielectric resonance (Fdr) be a whole harmonic of frequency of electrical resonance (Fer).

It goes without saying that Fdr corresponds to the wavelength λ.

In one example, Fdr may be a $3^{rd}$ harmonic of Fer. The Fer may be determined for one radiating element, or based on one radiating element while taking into account neighbouring radiating elements.

It has been noted by the Inventors, that a decrease in dimensions of an individual area of the radiating source (and thus in dimensions of the die) causes essential increase in the power density. Examples will be given as the description proceeds.

The Inventors have shown that the proposed integrated antenna behaving as an active DRA is capable of preserving gain and providing increased power density (TRP/per die size) in comparison with the power density which could be produced by a known antenna having spacing λ/2 between radiating elements on its dielectric die.

The radiating elements (sources) in the array may be controllable.

The electromagnetic beam generated by the integrated antenna may be directed. Further, the radiating sources may be adapted to be locked in frequency.

It should be noted that the proposed active DRA may be useful for various applications.

In some applications, the radiation of the radiation elements may be non-coherent. However, in the application described in the present invention with more details, the radiation sources may become coherent (i.e., may be brought to have the same phase). The radiation sources may be locked in frequency and/or in phase.

The proposed integrated antenna may be designed as follows.

The dielectric die (substrate) of any version of the proposed antennas may be selected so as to form DRA by selecting the dielectric die which demonstrates dielectric resonance due to its specific dimensions. It should be noted that such dimensions of the die may be computed by a specialist, for example using the Marcatili reference [7].

The dielectric resonance of the die in principle allows operation of the integrated antenna as an active DRA. Suitable dielectric resonance in a specific direction improves the DRA operation.

The above allows addressing a rectangular silicon die as a rectangular Dielectric Resonance Antenna (DRA), where each radiating element (say, a loop antenna+VCO) is now considered as a feeding source (feed, port) for the Silicon active DRA. However, for still more efficient operation of the active DRA, the dimensions of the die and parameters of the radiating sources may be selected/adjusted so that Fdr be a whole harmonic of Fer.

Since the power of the radiating sources is now combined (preferably, combined in-phase) within the DRA and radiated from it, there is no more need to keep a λ/2 spacing between the sources. In this case, by bringing the sources closer according to the Inventor's concept, the die area of each source element may be reduced.

For example, the spacing between the sources may be reduced so as to make it λ/4-λ/5. When the spacing was selected λ/4, the die area of a source was reduced by 4 while the power was increased by 4 compared to an area with a λ/2 conventional spacing, while functionality of the resulting antenna was not harmed and could even be improved.

Based on one of the above concepts, the Inventors also propose an exemplary, non-limiting implementation, which comprises a dense 2D multi-port radiator composed of a CMOS Silicon DRA fed by 30 sources. Each source (i.e., each radiating element) may be built of a compact differential Colpitts VCO with a $3^{rd}$ harmonic signal oscillating at 280 GHz connected to a loop exciting element, which together contribute for the active DRA. The fundamental harmonic signal of such VCOs may be of about 93 GHz. The proposed sources array may be locked in frequency and phase by the inherently strong mutual injection locking due to the sources proximity. Further, an integrated DAC (Digital to Analog Convertor) and an integrated SPI (Serial to Parallel Interface) may be used to control the operation of the dense array on-chip. Such a circuit may present a peak EIRP of +24.2 dBm, a record TRP of +9 dBm and a record power density of 4 $mw/mm^2$ (where TRP is total radiated power and where EIRP is effective isotopic radiated power characterizing also directivity of the beam, and where the obtained power density is much more than that in a similar conventional array where the spacing between radiation sources is $\lambda/2$)

The Inventors have shown that, optional use of a wireless, external injection locking technique [1], allows obtaining a more stable electromagnetic signal from the active DRA. The measurements were performed on the free running, injection locked VCO array.

Still further, a metal surface (a ground plane) is usually provided on the dielectric die of the proposed integrated antenna, on the surface opposite to the working surface.

According to a second aspect of the invention, there is also provided a method of manufacturing an integrated antenna for radiating an electromagnetic beam at a wavelength $\lambda$ (for example, belonging to a range of millimeter and submillimeter waves), the method comprises integrating an array of two or more radiating elements in a dielectric die having specific dimensions, while arranging the array to be denser than a conventional 1D or 2D array, would said conventional array be arranged on said dielectric die from two or more said radiating elements with a spacing $\lambda/2$ between the neighbouring radiating elements.

The method may further comprise arranging a spacing between the neighbouring radiating elements to be less then $\lambda/2$ from one another.

The method may also comprise selecting said dielectric die dimensions so as to ensure behaviour of the die as a DRA (by exhibiting suitable dielectric resonance).

The array may be arranged as a 1D, 2D or 3D array.

The method may be a 65 nm CMOS process.

According to a third aspect of the invention, there is provided a method of designing an integrated antenna comprising an array of two or more radiating elements integrated in a dielectric die, for radiating an electromagnetic beam at a wavelength $\lambda$ (for example, belonging to a range of millimeter and submillimeter waves), the method comprises steps of:

- selecting said dielectric die dimensions such that the die is capable of exhibiting dielectric resonance in a desired direction, or determining dielectric resonance for given dimensions of the dielectric die,
- selecting the radiating elements, theoretically capable of providing desired EIRP and Gain in the array,
- determining electrical resonance of the radiating elements (for example, by taking into account one element and the neighbouring radiating elements),
- bringing the dielectric resonance of the die into correspondence with the electrical resonance of the radiating elements,
- selecting a maximal number and a suitable arrangement of the radiating elements in the array within the die having the selected or given dimensions, at which selected maximal number the Gain remains substantially constant and maximal, and the EIRP is maximal.

Still preferably, the method may comprise one or more of the following steps:

1) Checking whether said dielectric resonance is exhibited at said wavelength $\lambda$ in a desired direction (for example, in the direction of the electromagnetic beam emitted from the die perpendicularly to its working surface;
2) Adjusting electric parameters of the radiating elements in the array to dimensions of the die so that frequency of dielectric resonance Fdr becomes substantially a whole harmonic of frequency of electrical resonance Fer;
3) Selecting a spacing between the neighbouring radiating elements in a 1D, 2D or 3D array (for example, the spacing may be less than $\lambda/2$ from one another),
4) Building a graph of EIRP and a graph of Gain for various numbers of radiating elements in the array,
5) Based on said two graphs, selecting a maximal number and a suitable arrangement of the radiating elements in the array within the die having the selected or given dimensions, at which selected maximal number the Gain remains substantially constant and maximal, and the EIRP is maximal.

The method may be implemented by performing computer simulations at each of the above-mentioned steps.

The method may further comprise steps of:

- providing an experimental antenna utilizing results of computer simulations at the above steps,
- performing measurements on the experimental antenna.
- adjusting any of the selected values of the die and of the radiating elements based on the measurement results, and repeating the method.

By using the above method, an active DRA may be designed and then manufactured according to the design. Such an active DRA will be thus capable of preserving gain of said electromagnetic signal at said wavelength while increasing power density radiated from said array (for example, in comparison with values of gain and power density of an integrated antenna having the spacing of $\lambda/2$ between its radiating elements).

According to still a further aspect of the invention, there is also provided a software product comprising computer implementable instructions and/or data for carrying out the method of designing the integrated antenna, the software product being stored on an appropriate non-transitory computer readable storage medium so that the software is capable of enabling operations of said method when used in a computer system.

The software product may be at least partially located in a Goniometer, for example for performing steps of computer simulations and/or measurements.

According to another aspect of the invention, there is provided a method of controlling the novel antenna, comprising a step of adjusting free running frequency of the radiating elements, for further locking thereof in frequency.

For controlling the antenna wherein its radiating elements comprise respective VCOs, the method may comprise regulating gate voltage of said VCOs to obtain mutual injection locking thereof.

The method may further comprise controlling and locking each specific radiating element in phase, upon said radiating element is locked in frequency.

A suitable software product has also been provided for the above control method.

The invention will be further described in detail as the description progresses.

BRIEF DESCRIPTION OF THE DRAWINGS

The invention will be further described and illustrated with the aid of the following non-limiting drawings in which:

FIG. 7 illustrates a measured EIRP and Frequency range of the entire array of an exemplary multi-port DRA, when only part of the radiation sources are turned on.

DETAILED DESCRIPTION OF SPECIFIC EMBODIMENTS

The Invention discloses a novel concept and an exemplary embodiment of a fully integrated chip antenna for modern applications, which has a more massive and/or more dense array of radiating array elements integrated in a dielectric die, than a conventional array. The antenna is preferably designed to work in the range of mm and submm-waves (λ). Compared to a conventional approach, the dielectric die in the proposed concept is recognized and is treated as a Dielectric Resonant Antenna (DRA).

More specifically, the antenna proposed by the Inventors may be implemented as a fully integrated chip scale dielectric resonance antenna for GHz and mm/submm-Wave applications. Still more specifically, the antenna may be configured as a fully integrated and digitally controlled Multi-port dense 2D radiator.

In the example, presented in the paper, each source consists of a W-band Voltage Controlled Oscillator (VCO) connected to an exciting loop element to inject its $3^{rd}$ harmonic to the DRA. The use of $3^{rd}$ harmonic is also an example. Further in the discussed example, the array elements occupy only 1.4×1.4 $mm^2$, the array elements are injection locked in frequency due to the tight coupling of the adjacent elements without the need of any locking signal. High resolution DACs (Digital to Analog Converters) may be used to accurately set the frequency; and a 3 wire SPI control interface may be implemented. In such an antenna, if fabricated in standard 65 nm CMOS process, the array achieves an EIRP of 24 dBm, a record TRP of +9 dBm and power density of 4 $mW/mm^2$ with 1.8% efficiency at 280 GHz.

Both the above-mentioned concept and example will be further discussed and illustrated with the aid of the non-limiting drawings.

Figure 1A:
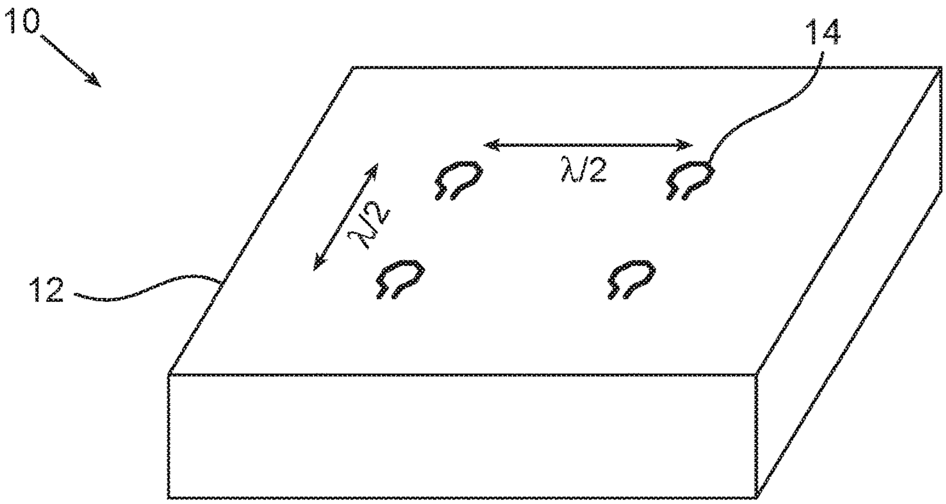
FIG. 1A (prior art) shows a known arrangement of antennas on a substrate.
Figure 1B:
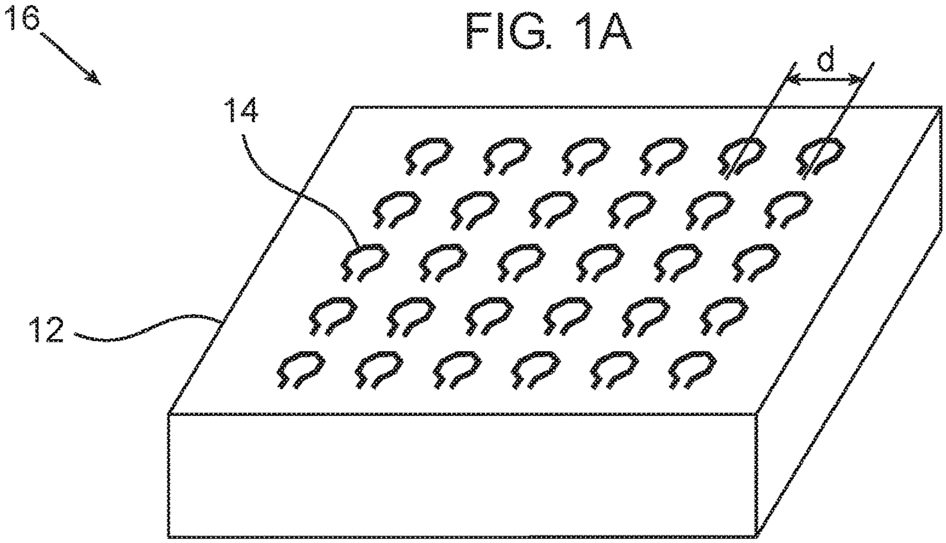
FIG. 1B schematically illustrates the concept of the invention, by presenting a specific example.
Figure 1C:
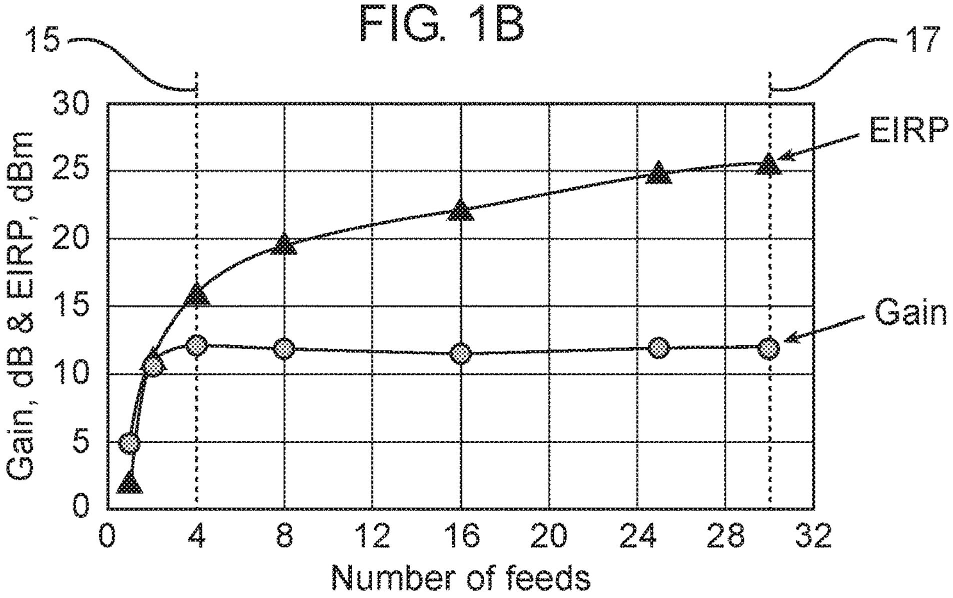
FIG. 1C schematically illustrates the effect brought by the invention, by presenting resulting Gain and EIRP curves built for the schematic configurations of FIGS. 1A and 1B.

FIGS. 1A, 1B, and 1C present an exemplary illustration to the concept of the invention. As already mentioned, FIG. 1A (prior art) shows a conventional integrated antenna 10 formed on a dielectric die 12 with a 2D array of radiation elements/sources 14 spaced by λ/2 from one another, where λ is the wavelength at which the antenna 10 radiates.

FIG. 1B shows a schematic example of the proposed integrated antenna 16 formed on an identical die 12, with the added radiating sources 14 per the same die area and with the reduced spacing "d" between the radiation sources.

FIG. 1C relates to a computer simulation of properties of the antenna 16 and shows increase in the simulated EIRP (the upper curve with triangles) while maintaining the same Gain (the bottom curve with circles) as in a conventionally designed antenna 10 with a λ/2 spaced array, and in the same direction of radiation. The reduced spacing "d" is definitely smaller than λ/2, and may be of about λ/4-λ/5. It should be noted that the reduced spacing may be used at least for elements in a row (or a column). The value of spacing in rows may differ from the value of spacing in columns.

The specific example is a 1.4×1.4×0.22 $mm^3$ Silicon die, which was found by the Inventors to provide maximum gain at 280 GHz for a multi-port feed (according to HFSS simulations), may be excited with different number of feeding elements. It can be seen in FIG. 1C, that a minimum of four elements are required to reach the optimal gain of this DRA. Actually, line 15 may correspond to the conventional antenna of FIG. 1A. Adding additional feeding elements, does not influence the DRA gain. This is a key factor in the dense array design. Indeed, since each feeding element is driven by a power source (for example VCO), increasing the number of feeds will increase the radiated power from the DRA. Following this concept, a maximum amount of 30 sources (5×6) was placed in this DRA structure.

Figure 1D:
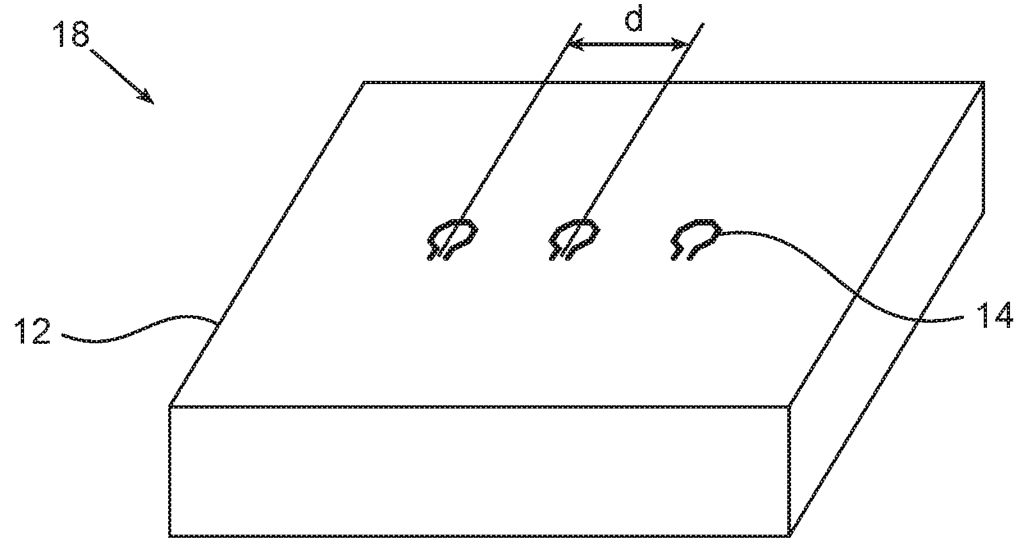
FIG. 1D illustrates another example of the inventive concept, with a 1D array of radiating elements.
Figure 1E:
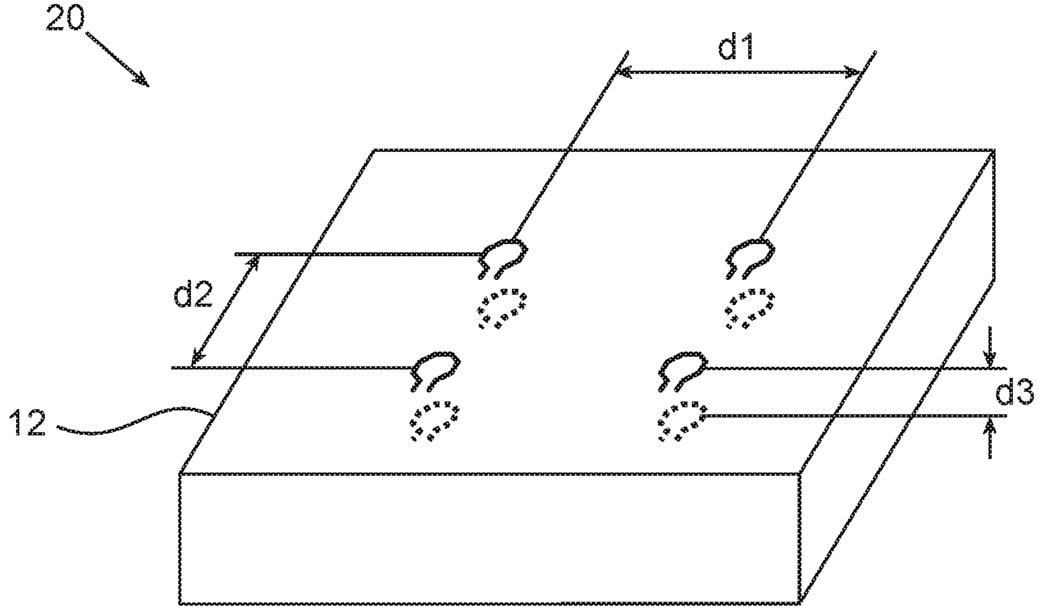
FIG. 1E illustrates yet a further example of the inventive concept, with a 3D array of radiating elements.

The inventive concept, which in this example may be called a Multi-port Dense 2D DRA, allows adding exciting sources per the same die area, along with the increase in the resulting EIRP. Actually, line 17 corresponds to the example shown in FIG. 1B. FIG. 1D illustrates another embodiment 18 of the antenna on a die 12, with a 1-D array of radiating elements 14, which is also characterized by a reduced spacing "d". FIG. 1E illustrates another novel version 20 of an integrated antenna. It comprises a 3D array of radiating elements which may be similar to 14, integrated in a dielectric die 12. In this example, a 2D matrix (array) of radiating elements on the surface repeats itself in a deeper layer of the die. The deeper layer of the 3D array may have less elements, and/or be slightly shifted relatively to the surface layer. This 3D array is denser than its conventional half on the surface, since the 3D array uses the same or almost the same area on the working (radiating) surface of the die 12.

In yet another example (not shown) a 1D array may be formed on any of the layers. It should be noted that the spacings d1, d2, d3 between neighboring radiating sources in the array may differ from one another. Optionally at least one of the spacings d1-d3 may be smaller than λ/2. The antenna 20 may be designed for any wavelength, but is preferable for the range of millimeter or submillimeter wavelengths.

Examples of FIGS. 1A-1E relate to a rectangular silicon die.

Sizing and Mode Analysis for a rectangular silicon die may be provided by a specialist in the art and be assisted by applying the Dielectric Waveguide Model (DWM) presented by Marcatili [7].

The Inventors has found that at frequencies high enough, where the die size is comparable with the wavelength in the silicon, the radiating modes can be excited inside the silicon die so that it can be used in practice as a DRA. Such a DRA is called active DRA in the present application. According to that approach, the on-chip metal pattern (metal loop in this case) is no longer considered as a radiating metal antenna, but rather as an exciting element. Power fed to the loop, induces electro-magnetic fields in the silicon die, which resonate in one or more, specific and size dependent modes and radiate from the front side of the chip. This allows the highest form of integration for a DRA, resulting in the active DRA. It is because now, both the power generation circuits and the excitation elements may be embedded in the DRA. Such an active DRA is a new Chip Scale Dielectric Resonance Antenna (CSDRA) which introduces several important advantages for fully integrated radiating power sources. To demonstrate the way the silicon die is designed as a CSDRA for a desired frequency, we start by analyzing the die as a rectangular DRA placed on a finite ground plane. To evaluate the required dimensions we can solve the so-called transcendental and separation equations of Marcatili for the our desired resonance frequency, 280 GHz, or analyze the resonance frequency for a given set of substrate width, length and height (a, b and d).

The mentioned equations can be solved for the fundamental mode of DRA, or higher order modes. While optimizing the dimensions, physical limitation of the silicon die must be taken into consideration, for example the minimal die dimensions suitable for handling and measurements. The die must also be large enough to accommodate the active circuits, bonding pads and the exciting elements.

Figure 5:
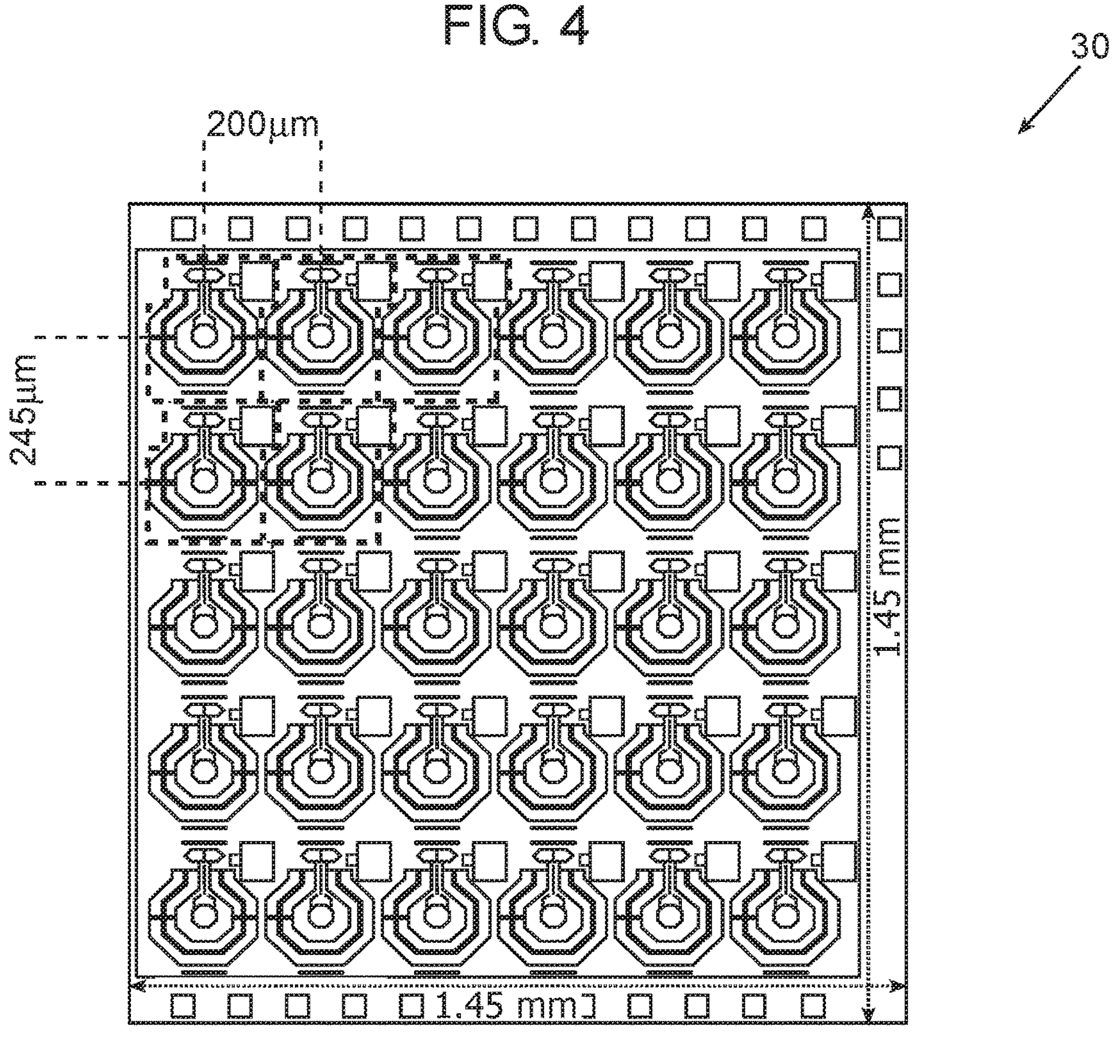
FIG. 5 illustrates an exemplary design of a Dense array Architecture.

Once the foundations for the CSDRA have been laid out, we expand this concept to CSDRAs with more than one exciting element (FIG. 1*b*, FIG. 5). This will result in more radiated power and gain, assuming each of the excitations is driven by its own VCO and that the excited power from different ports can be efficiently summed and radiate out.

Figure 2A:
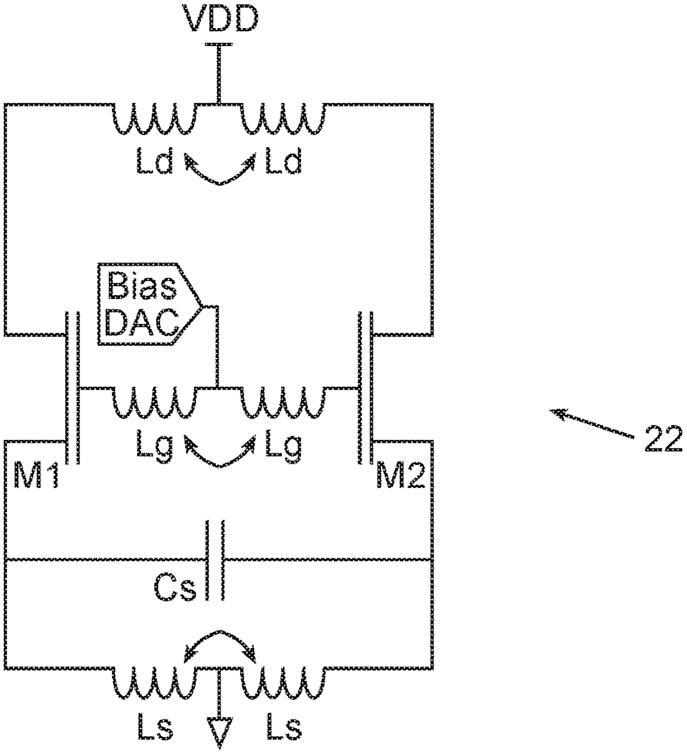
FIG. 2A and FIG. 2B are a schematic diagram and a layout of an exemplary radiating source in the form of a modified Colpitts single VCO.
Figure 2B:
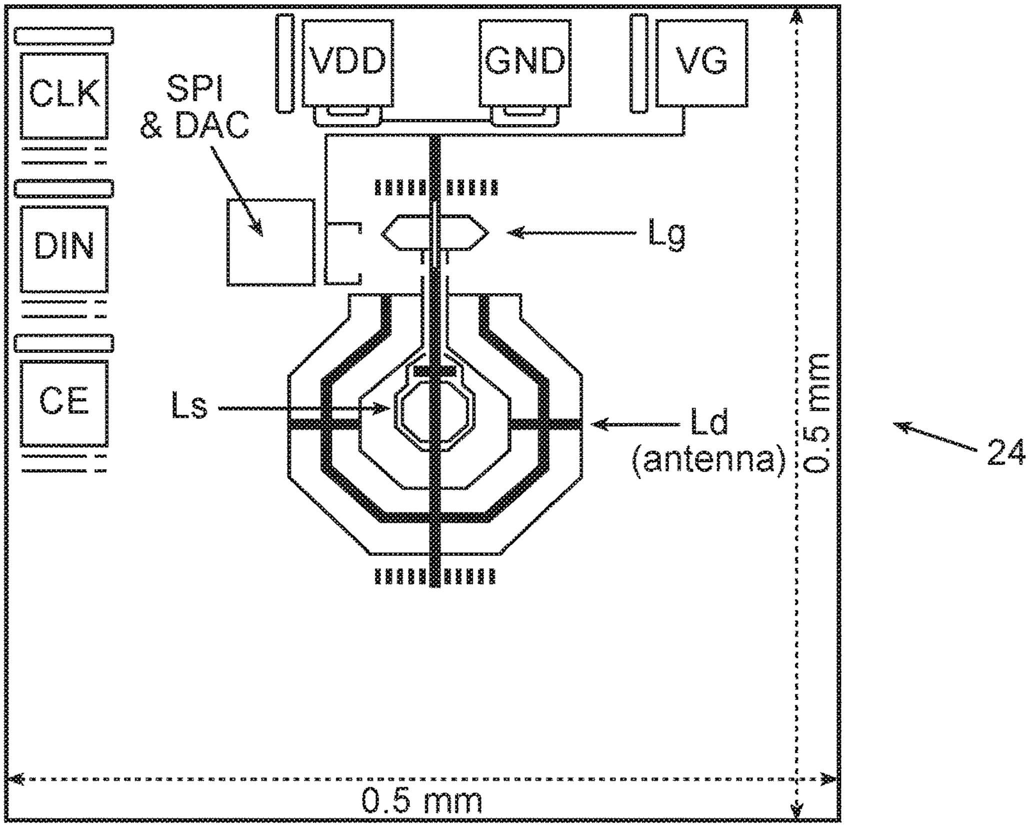
Figure 2C:
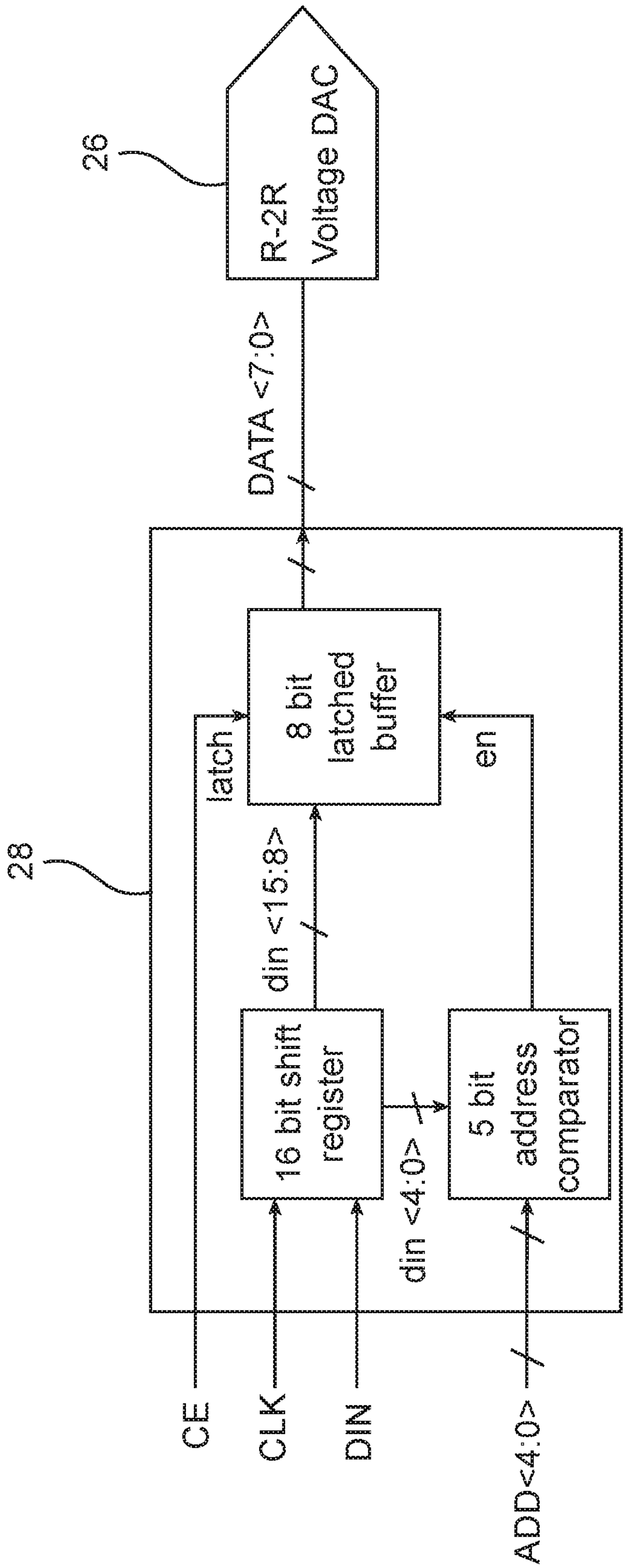
FIG. 2C shows an example of a digital control scheme for the radiating source shown in FIGS. 2A, 2B.

FIG. 2A and FIG. 2B show an exemplary radiating element of the antenna array. In this example, FIG. 2A is a scheme 22, and FIG. 2B is an implementation (layout) 24 of a modified Colpitts single VCO (a compact differential VCO). FIG. 2B shows the compact layout and the DC supply. The die size is adapted/tuned for maximum gain. FIG. 2C shows an exemplary digital control scheme for the gate tuning voltage with addressable SPI.

The radiating element 22 shown in FIG. 2A illustrates at least some of the conventional electrical elements, parameters/values of which should be taken into account by a specialist when determining resonance frequency of the radiation element. Preferably, parameters of neighboring elements are also taken into account. In the figures: DAC—Digital to analog converter; SPI—serial to parallel interface; VDD—positive supply (Vdd drain); CE—enable signal; CLK—clock; DIN—Data in; GND—ground; VG—bias. Ld—loop element/antenna of the radiating element; ADD—address.

To minimize the layout and to maximize the sources array density, a compact, differential VCO was realized and an example is shown in FIGS. 2A-C. The area of the die for that exemplary radiating source is 0.5 mm×0.5 mm. This harmonic VCO is based on a modified Colpitts architecture, which maximizes the 3rd harmonic output [1].

The gate and source inductors Lg, Ls are fully differential and were nested in the design to minimize the layout without degrading the radiating source performances. The gate voltage (VG) is connected at the virtual ground of the gate inductor with no need for RF chokes. The drain inductor is a differential single loop inductor. The design takes advantage of the fact that the drain inductor acts as a DC path for VDD, an inductive load at the fundamental frequency and a DRA feed at the $3^{rd}$ harmonic. This triple use allows a compact design, with optimized and virtually lossless power transmission. The loop is carefully co-designed with the VCO to maximize the generated power at the $3^{rd}$ harmonic and thus is not matched to pure 50Ω, but to a trade-off impedance between delivered power, DRA gain and efficiency. Simulation shows that each VCO injects more than 0 dBm around 280 GHz to the loop. The single source size may be for example 245×200 $\mu m^2$. The tuning voltage for each VCO may be set by an 8-bit voltage DAC 26 controlled thru a 3 wire SPI interface 28 (FIG. 2C). The lines which are indicated by short diagonal marks in FIG. 2C, are digital buses actually comprising a number of parallel data channels.

Figure 3A:
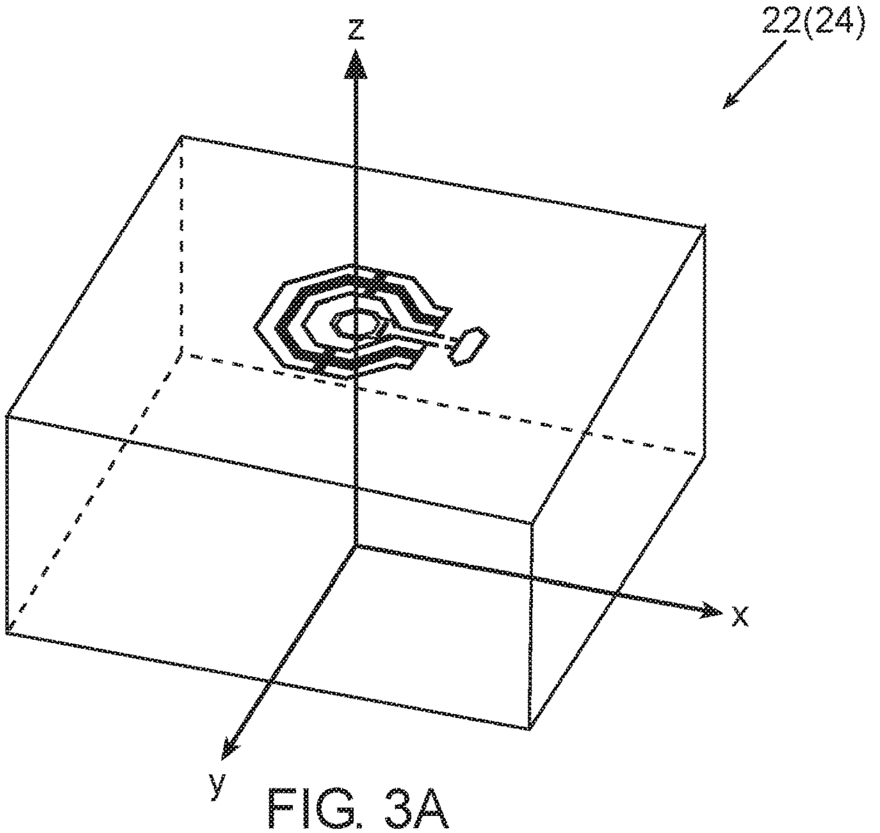
FIG. 3A shows a 3D view of an exemplary radiating element being a single VCO transmitter.
Figure 3B:
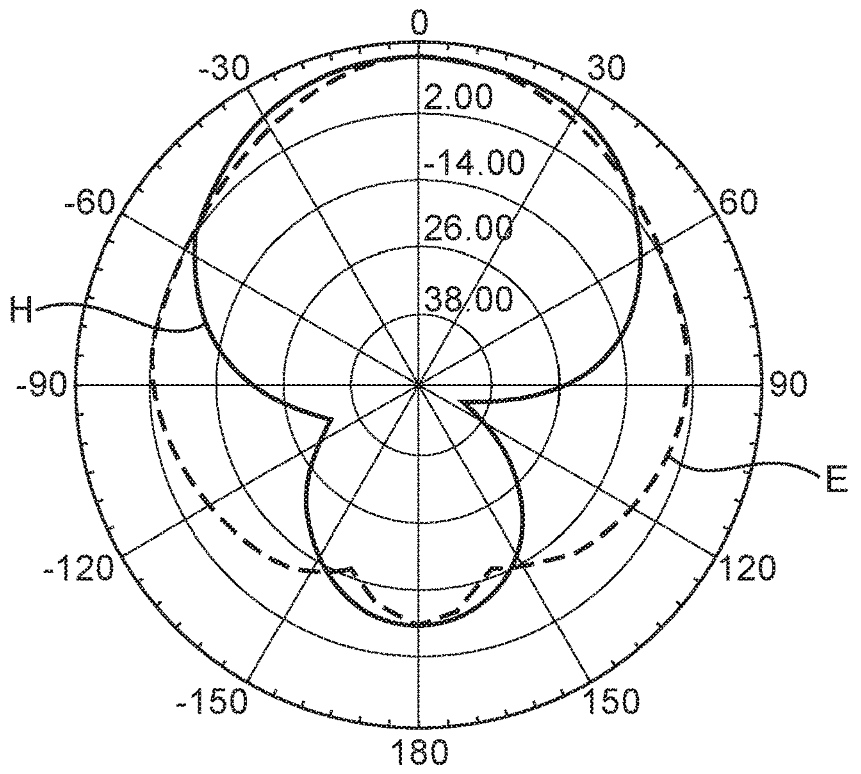
FIG. 3B shows a simulated gain pattern in two perpendicular planes E, H of the single transmitter of FIG. 3A.

FIG. 3A shows a 3D view of a single VCO transmitter on a die, in axes X, Y, Z, for example the transmitted marked as 22 or 24. The elementary die shown in FIG. 3A may have dimensions close to of about 0.5 mm×05 mm×0.5 mm. The desired radiation direction is along axis Z, from the upper (working) surface of the radiating source. FIG. 3B shows a simulated gain pattern in two perpendicular planes E and H of the antenna. The inner curve in FIG. 3B indicates gain in the plane H, the outer curve—in the plane E. The numbers in the radius show values in db. The numbers on the circle indicate degrees.

Figure 4:
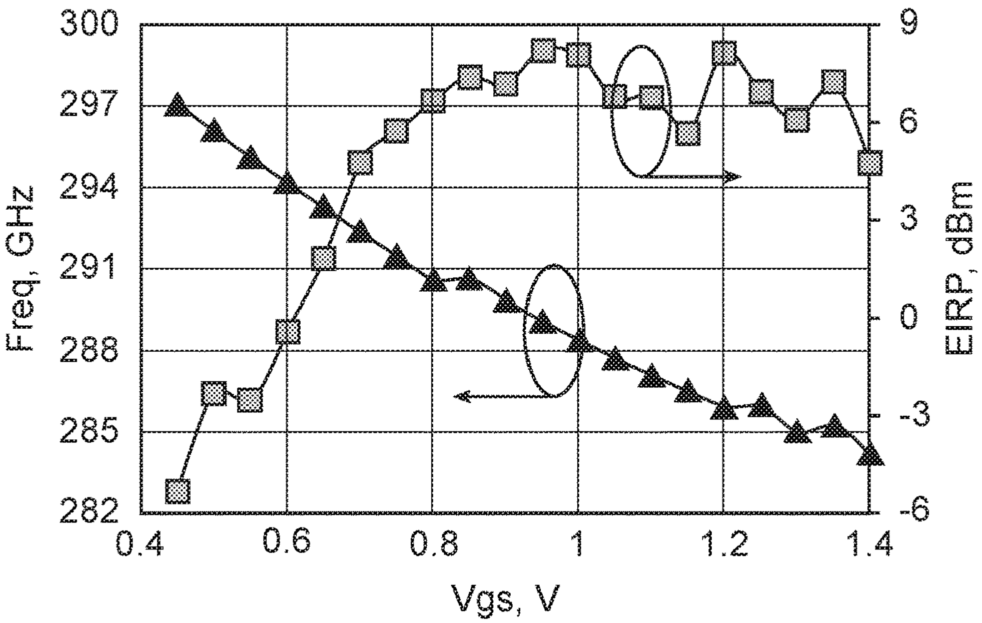
FIG. 4 shows a measured EIRP and Frequency tuning range of a single-element DRA.

Full 3D electro-magnetic simulations show the loop has an inductance ~140 pH at W-band, with a resonance frequency higher than 130 GHz. At J band which is the frequency range of our interest, the loop shows ~65 Ohms. For a single element DRA, based on this source VCO shown in FIG. 3, this yields 8.3 dBi gain, with 55% efficiency (FIG. 4, see below). For this optimal gain, the die size for a single element DRA is 0.5×0.5×0.22 $mm^3$ (W×L×H).

FIG. 4 illustrates a graph of Measured EIRP (the upper curve with squares) and of Frequency (the lower curve with triangles) tuning range of a single-element DRA, for example of DRA comprising the radiating element as in FIG. 2 or FIG. 3. The oval indicators with arrows associate the curves with the respective axes.

The horizontal axis shows various values of gain-source voltage (Vgs), for controlling frequency of the radiating element.

FIG. 5 illustrates an exemplary design 30 of a dense array architecture schematically shown in FIG. 1B as antenna 16. It presents a photo of a unit source cell integrated within of about the $(1.4×1.4\ mm)^2$ silicon die. The fabricated 5×6 multi-port DRA shows exemplary values of the unit cell dimensions and exemplary spacing.

The gaps (spacing) between the radiating sources in lines and in columns of the array may be different. It should be noted that at least one of the gaps—between columns or between rows—may be reduced (be lower than λ/2) in the novel antenna.

The single element dimensions and routing constraints allowed for a 245 micrometre and 200 micrometre vertical and horizontal array spacing, respectively, resulting into a very compact 5×6 array for λ of about 1.07 mm (corresponding to 280 GHz). As agreed, the single radiating element's dimensions are less than (λ/2×λ/2). For the bias, the DC supply voltage and ground may be routed along the vertical axis of symmetry of each element, where the metal traces have the least effect on the electric field. Each column may be fed from a dedicated top and bottom power and ground pads to minimize voltage drop and add some degree of flexibility in measurement. The gate voltage for each VCO, which sets the frequency, is determined by an on-chip DAC, as shown in FIG. 2.*b*. The 8 bit, R-2R ladder DAC can set the gate voltage from 0V up to the supply voltage and provides a 5 mV voltage step.

To minimize the metal foot print of the control and bias lines distribution, each DAC is controlled by an addressable SPI. Each SPI has a 5 bit pre-wired address and accepts a 16 bit serial stream. The gate voltages may be individually set for each VCO to allow modification of frequency, to improve the mutual injection locking process. Furthermore, once all the VCOs are locked in frequency, a small shift of the tuning voltage of a single VCO, while still locked, would force it to modify its phase and can assist in aligning all the phases or possibly steer the beam. As seen in FIGS. 1B, 1C, the gain of a 30 sources feed DRA is ~12 dBi. Since each source injects in simulation 0 dBm, the theoretical EIRP and TRP of this multi-port radiator is 26.8 dBm and 12.5 dBm.

Experimental Results

The 5×6 array was fabricated in a standard 65 nm CMOS process. The top, 3.4 micrometre thick copper metal (M9, a thick layer of the metal ground plane), was used for the radiating elements to minimize ohmic losses. The source and gate inductors are realized at a lower metal to reduce the coupling to the antenna and to overcome width and spacing constraints. Total die area is 1.45×1.45 $mm^2$ slightly larger than the desirable 1.4×1.4 $mm^2$ due to dicing constraints. 27 out of the 30 VCOs were locked in frequency, with no external locking signal. Indeed, most of the VCOs managed to achieve frequency lock for the same DAC value for all the VCOs, except for some of the top row VCOs, which required finer tuning limited by the DAC accuracy in this circuit.

Figure 6:
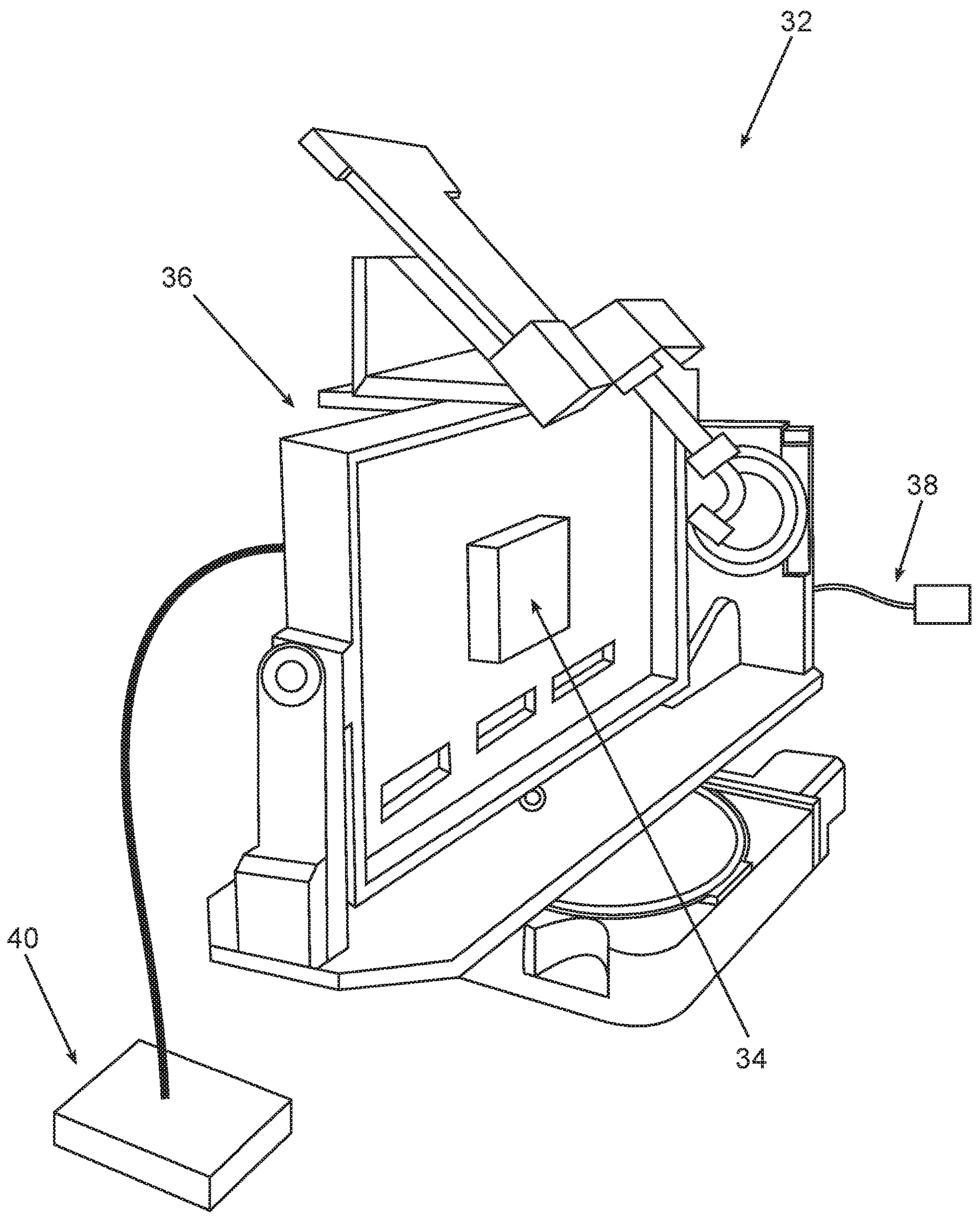
FIG. 6 illustrates a Motorized Goniometer stage used for controlling radiation sources, for example, for full 3D antenna measurements with W-band source mounted for continuous wireless injection lock.

FIG. 6 shows a Motorized Goniometer stage 32 used for full 3D antenna measurements with W-band source mounted for continuous wireless injection lock. The measurements may be performed as part of the design process and/or for inspection of integrated antennas in their manufacturing process.

Measurements of the antenna radiation have been performed in different directions, to determine whether the electromagnetic beam has the required directivity and power.

34 indicates the integrated antenna to be checked, mounted on a card of RP4350 PCB.

36 is a motorized stage, movable with a PCB mounting plate to which the card 34 is connected.

38 is a mounted W-band source for wireless injection locking of the antenna sources.

40 is an Arduino controller which may embed a software product for designing the antenna and/or controlling the antenna.

Optionally applying a wireless, external injection locking technique [1], the Inventors have shown that a more stable signal of the active DRA could be obtained. The measurements were performed on the free running, injection locked VCO array. For example, each VCO consumes 12 mA from a 1.3V supply at the centre frequency. The measured peak EIRP was 24.1 dBm at 280 GHz slightly off boresight without any focusing lens, when radiating from the top side of the die. The difference from the simulated 26.3 dBm EIRP of 27 VCOs is due to the phase misalignment between the VCOs. Modifying the gate voltages does improve the EIRP as suggested, but the minimum voltage step (~5 mV) proved to be too large for achieving perfect phase alignment of all VCOs.

The TRP was measured with an accurate, scanning goniometer stage 36 for 3D polar measurement.

A VDI WR3.4 down converter and E4448 spectrum analyser were used to down convert and detect the received signal. The Total Radiated Power is +9 dBm at 280 GHz. The array was scanned at 30 cm at an azimuth and elevation range of ±80 degrees.

Figure 7:
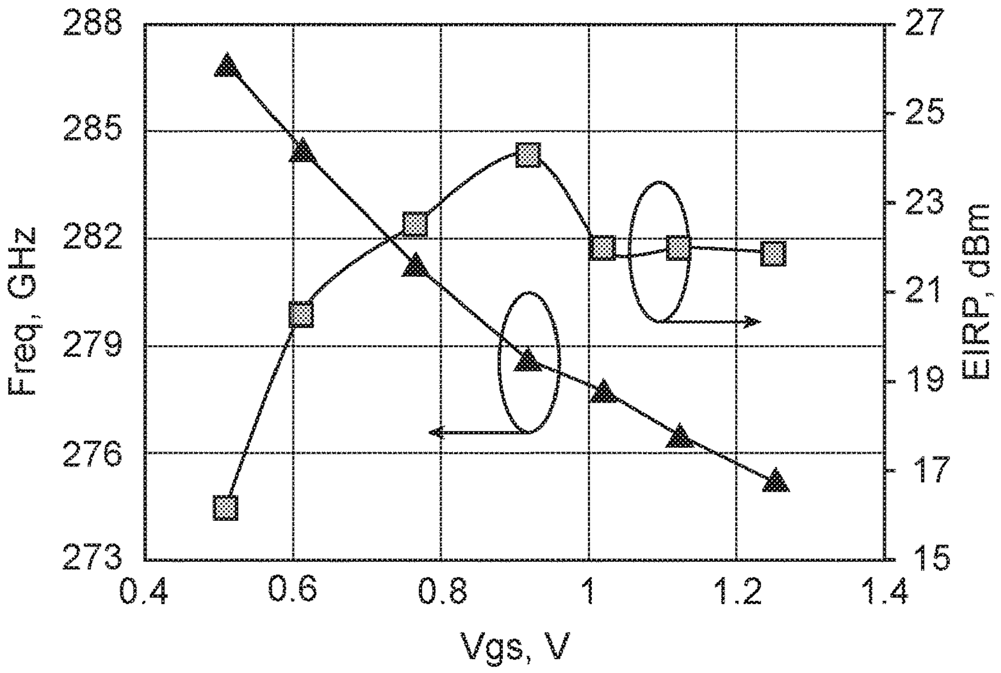

FIG. 7 schematically illustrates a measured EIRP (curve with squares) and Frequency (curve with triangles) range of the entire array of multi-port DRA, when 27 out of 30 VCOs (see FIG. 1B, FIG. 5) are turned on. The measurements were performed by a Goniometer of FIG. 6. One may notice that the graph shows great increase in the EIRP in comparison with the graph of FIG. 4 for a single antenna.

Figure 8:
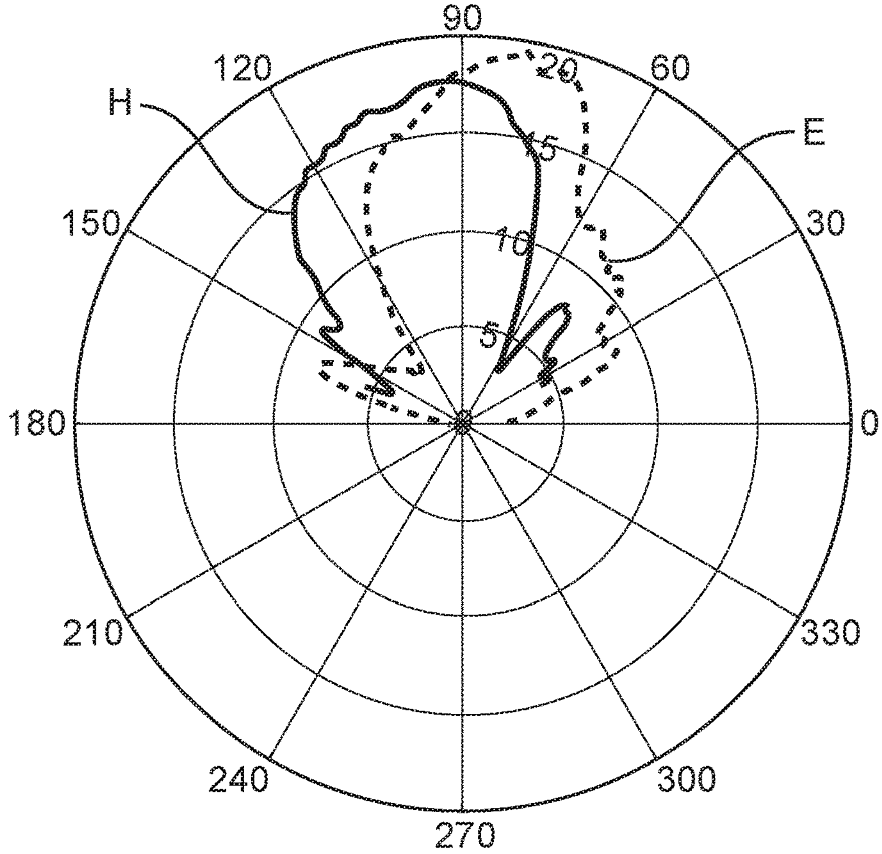
FIG. 8 illustrates a graph of measured EIRP radiation pattern of the array at two perpendicular planes E and H of the antenna.

FIG. 8 shows the measured radiation pattern at E and H planes of the radiating array of the discussed integrated antenna. The curve slightly shifted to the left indicates the H-plane; the curve shifted to the right indicates the E plane. The numbers in the radius show values in db. The numbers on the circle indicate degrees.

The inventive concept described in the patent application may be further illustrated by Table I, which speaks for itself.

TABLE I

Performance Summary Of Fully Integrated J Band Antenna Arrays
(This patent application versus References 1-6)

| | Unit | This Application | [1] | [2] | [3] | [4] | [5] | [6] |
|---|---|---|---|---|---|---|---|---|
| Process | | 65 nm CMOS | 65 nm CMOS | 45 nm CMOS | 65 nm CMOS | 65 nm CMOS | 45 nm CMOS | 65 nm CMOS |
| Center Freq | GHz | 280 | 296 | 280 | 345 | 338 | 317 | 260 |
| Array Size | | 5 × 6 | 2 × 3 | 4 × 4 | 1 × 4 | 4 × 4 | 1 × 8 | 2 × 4 |
| Peak EIRP | dBm | 24.1 | 22 | 9.4 | 13.8 | 17.1 | 22.5 | 15.7 |
| TRP | dBm | +9 | 5.4 | −7.2 | +1 | −0.9 | 5.2 | 0.5 |
| DC power | mW | 421 | 67.2 | 820 | 105 | 1540 | 610 | 800 |

TABLE I-continued

Performance Summary Of Fully Integrated J Band Antenna Arrays (This patent application versus References 1-6)

| | Unit | This Application | [1] | [2] | [3] | [4] | [5] | [6] |
|---|---|---|---|---|---|---|---|---|
| Efficiency | % | 1.88 | 5.15 | 0.023 | 1.2 | 0.053 | 0.54 | 0.14 |
| Bandwidth | % | 4.11 | 2.4 | 3.2 | 1.1 | 2.1 | — | 1.4 |
| Die Size | $mm^2$ | 2.1 | 2.22 | 7.29 | 0.71 | 3.9 | 2.08 | 2.25 |
| TRP/Die Size | $mW/mm^2$ | 4.08 | 1.56 | 0.026 | 1.77 | 0.21 | 1.6 | 0.5 |

In the present application, the novel concept of a dense integrated antenna and of an active DRA, which are especially useful for Millimeter and Submillimeter waves, have been presented by using an example of a multi-port fed DRA for a THz transmitter array. The inventive concept alleviates the conventional need of λ/2 between antennae for optimal spatial combining. By combining the signal injected from the multiple sources feeds into the DRA, maximum sources density can be achieved. The concept was demonstrated over a 1.4×1.4 $mm^2$ DRA with 30 source feeds. The realized CMOS array achieves at 280 GHz more than +24 dBm EIRP, a record TRP of +9 dBm over 2.2 $mm^2$ resulting into a record 4 $mW/mm^2$, which is more than twice more the current feasibility limit of conventional λ/2 spaced arrays.

It should be appreciated that while the invention has been described with reference to specific example and drawings, other embodiments and versions of the invention may be proposed, which should be considered part of the invention whenever defined by the claims which follow after the list of References.

REFERENCES

1. S. Jameson, E. Halpern and E. Socher, "A 300 GHz wirelessly locked 2×3 array radiating 5.4 dBm with 5.1% DC-to-RF efficiency in 65 nm CMOS," 2016 *IEEE International Solid-State Circuits Conference* (*ISSCC*), San Francisco, Calif., 2016, pp. 348-349.
2. K. Sengupta et al., "A 0.28 THz Power Generation and Beam-Steering Array in CMOS Based on Distributed Active Radiators", IEEE J. Solid-State Circuits, vol. 47, no. 12, pp. 3013-3031, December 2012.
3. S. Jameson et al., "Sub-harmonic wireless injection locking of a THz CMOS chip array", IEEE Radio Frequency Integrated Circuits Symp., pp. 115-118, May 2015.
4. Y. Tousi and E. Afshari, "Scalable THz 2D Phased Array with +17 dBm of EIRP at 338 GHz in 65 nm bulk CMOS," ISSCC Dig. Tech. Papers, pp. 258-259, February 2014.
5. R. Han et al., "A 320 GHz Phase-Locked Transmitter with 3.3 mW Radiated Power and 22.5 dBm EIRP for Heterodyne THz Imaging Systems", ISSCC Dig. Tech. Papers, pp. 1-3, February 2015.
6. R. Han and E. Afshari, "A 260 GHz Broadband Source with 1.1 mW Continuous Wave Radiated Power and EIRP of 15.7 dBm in 65 nm CMOS", ISSCC Dig. Tech. Papers, pp. 138-139, February 2013.
7. E. A. J. Marcatili, "Dielectric rectangular waveguide and directional coupler for integrated optics," in The Bell System Technical Journal, vol. 48, no. 7, pp. 2071-2102, September 1969.

The invention claimed is:

1. An integrated antenna for radiating an electromagnetic beam at a wavelength λ belonging to a range of millimeter and submillimeter waves, wherein:

the antenna is integrated in a dielectric die having specific dimensions such that the die exhibits a dielectric resonance at the wavelength λ in a direction of a directable electromagnetic beam emitted from the dielectric die perpendicularly to a die radiating surface, the antenna is configured as an array of two or more radiating elements such that each of the two or more radiating elements exhibits an electrical resonance, each radiating element includes an active integrated circuit for providing radiating power to the radiating element, and wherein, for the array of two or more radiating elements, the dielectric resonance may exist simultaneously with a mutual electric resonance of the two or more radiating elements in the array, and wherein at least some of the radiating elements neighbouring in the array are placed at a spacing between λ/4-λ/5 from one another, and wherein the antenna is capable of exhibiting both the dielectric resonance and the electric resonance, corresponding to each other;

and wherein that the die and the two or more radiating elements have frequency of dielectric resonance (Fdr) corresponding to the wavelength λ, which is a whole harmonic of frequency of electrical resonance (Fer).

2. The antenna according to claim 1, wherein said array is a three-dimensional array comprising three or more radiating elements.

3. The antenna according to claim 2, forming an active dielectric resonance antenna in operation, whenever radiation elements serve as radiation sources of the dielectric resonance antenna.

4. The antenna according to claim 1, wherein the radiation elements are adapted to be locked in frequency and/or in phase.

5. The antenna according to claim 1, wherein said A is approximately 1.07 mm.

6. The antenna according to claim 1, wherein said active integrated circuit included in each radiating element, comprises a Voltage Controlled Oscillator (VCO).

7. The antenna according to claim 6, wherein said VCO is a compact differential Colpitts VCO capable of producing an N-th harmonic signal oscillating at the wavelength λ, the VCO being connected to a loop exciting element.

8. The antenna according to claim 1, wherein each of said radiating elements further comprises a control scheme for controlling operation of the radiating element and thereby operation of the array.

9. The antenna according to claim 1, fabricated in a 65 nm CMOS process.

10. A method of increasing the total radiated power of an integrated antenna by manufacturing the integrated antenna for radiating an electromagnetic beam at a wavelength λ belonging to a range of millimeter and submillimeter waves and for exhibiting both a dielectric resonance and an electric resonance simultaneously, corresponding to each other, the method comprises integrating an array of two or more radiating elements in a dielectric die having specific dimensions such that the die exhibits the dielectric resonance at the wavelength λ in a direction of the electromagnetic beam emitted from the die perpendicularly to a die radiating surface, ensuring that each radiating element includes an active integrated circuit for providing radiating power to the radiating element such that each of the two or more radiating elements exhibits the electrical resonance, while arranging the array so that at least some of the radiating elements neighbouring in the array are placed at a spacing less than about λ/4 from one another, and selecting the dimensions of the die and parameters of said two or more radiating elements so that frequency of dielectric resonance (Fdr) corresponds to the wavelength λ and be a whole harmonic of 20 frequency of electrical resonance (Fer).

11. The method according to claim 10, being a 65 nm CMOS process.

12. A method of manufacturing an integrated antenna for radiating an electromagnetic beam at a wavelength λ belonging to a range of millimeter and submillimeter waves, the method comprising:

integrating an array of two or more radiating elements in a dielectric die having specific dimensions such that the die exhibits the dielectric resonance at the wavelength λ in a direction of the electromagnetic beam emitted from the die perpendicularly to a die radiating surface, ensuring that each radiating element includes an active integrated circuit for providing radiating power to the radiating element such that each of the two or more radiating elements exhibits the electrical resonance, while arranging the array so that at least some of the radiating elements neighbouring in the array are placed at a spacing less than λ/4 from one another, and further comprising preliminary steps of:

selecting dimensions of said dielectric die, such that the die is capable of exhibiting dielectric resonance in a direction of a directable electromagnetic beam emitted from the die perpendicularly to a working (radiating) surface, or determining dielectric resonance for the die having given dimensions, selecting the radiating elements, theoretically capable of providing desired Effective Isotopic Radiating Power (EIRP) and Gain in the array, determining electrical resonance of the radiating elements;

bringing the dielectric resonance of the die into correspondence with the electrical resonance of the radiating elements;

selecting a maximal number and a suitable arrangement of the radiating elements in the array within the die having the selected or given dimensions, at which maximal number the Gain remains substantially constant and maximal, and the EIRP is maximal;

Adjusting electric parameters of the radiating elements in the array to dimensions of the die so that frequency of dielectric resonance Fdr corresponds to the wavelength λ and becomes substantially a whole harmonic of frequency of electrical resonance Fer; and Selecting a spacing between the neighbouring radiating elements in a one dimension, two dimension, or three dimension array, where the spacing is less than λ/2 from one another.

13. A software product comprising computer implementable instructions and/or data for carrying out the method according to claim 10, the software product being stored on an appropriate non-transitory computer readable storage medium so that the software is capable of enabling operations of the said method when used in a computer system.

14. The method according to claim 10, further comprising a step of adjusting free running frequency of the radiating elements, for locking thereof in frequency.

15. A method of manufacturing an integrated antenna for radiating an electromagnetic beam at a wavelength λ belonging to a range of millimeter and submillimeter waves, the method comprising:

integrating an array of two or more radiating elements in a dielectric die having specific dimensions such that the die exhibits the dielectric resonance at the wavelength λ in a direction of the electromagnetic beam emitted from the die perpendicularly to a die radiating surface, ensuring that each radiating element includes an active integrated circuit for providing radiating power to the radiating element such that each of the two or more radiating elements exhibits the electrical resonance, while arranging the array so that at least some of the radiating elements neighbouring in the array are placed at a spacing less than λ/4 from one another, and further comprising preliminary steps of:

(1). Selecting dimensions of said dielectric die, such that the die is capable of exhibiting dielectric resonance in a direction of a directable electromagnetic beam emitted from the die perpendicularly to a working (radiating) surface, or determining dielectric resonance for the die having given dimensions;

(2). Selecting the radiating elements, theoretically capable of providing desired Effective Isotopic Radiating Power (EIRP) and Gain in the array;

(3). Determining electrical resonance of the radiating elements;

(4). Adjusting electric parameters of the radiating elements in the array to dimensions of the die so that frequency of dielectric resonance Fdr corresponds to the wavelength λ and becomes substantially a whole harmonic of frequency of electrical resonance Fer, (5). Selecting a spacing between the neighbouring radiating elements in a one dimension, two dimension, or three dimension array, where the spacing is less than λ/2 from one another;

(6). Selecting a maximal number and a suitable arrangement of the radiating elements in the array within the die having the selected or Given dimensions, at which maximal number the Gain remains substantially constant and maximal, and the EIRP is maximal; and (7). Bringing the dielectric resonance of the die into correspondence with the electrical resonance of the radiating elements.

16. An improved integrated antenna for radiating an electromagnetic beam at a wavelength λ belonging to a range of millimeter and submillimeter waves, Wherein (a) the antenna is integrated in a dielectric die having specific dimensions such that the die exhibits a dielectric resonance at the wavelength λ in a direction of a directable electromagnetic beam emitted from the dielectric die perpendicularly to a die radiating surface; and Wherein (b) the antenna is configured as an array of two or more radiating elements where each of the two or more radiating elements (i) is capable of providing desired Effective Isotopic Radiating Power (EIRP) and Gain in the array and (ii) includes an active integrated circuit for providing radiating power to the radiating element, and wherein (c) the array of two or more radiating elements exhibits an electrical resonance, and the dielectric resonance of the array may exist simultaneously with a mutual electric resonance of the two or more radiating elements in the array, and wherein (d) at least some of the radiating elements neighbouring in the array are placed at a spacing between λ/4-λ/5 from one another, and wherein (e) the antenna is capable of exhibiting both the dielectric resonance and the electric resonance, corresponding to each other; and wherein (f) that the die and the two or more radiating elements are adjusted to have frequency of dielectric resonance (Fdr) corresponding to the wavelength λ, which is a whole harmonic of frequency of electrical resonance (Ter); and wherein (g) a maximal number and a suitable arrangement of the radiating elements are added to the array within the die, such that a maximal number the Gain remains substantially constant and maximal, the EIRP is maximal, and the dielectric resonance of the die corresponds to the electrical resonance of the radiating elements.

* * * * *